United States Patent [19]

Cheng

[11] Patent Number: 5,381,570
[45] Date of Patent: Jan. 17, 1995

[54] COLLAPSIBLE BABY PLAYING BED

[75] Inventor: Ying-Hsiung Cheng, San Diego, Calif.

[73] Assignee: Top Fortune Ltd., San Diego, Calif.

[21] Appl. No.: 124,467

[22] Filed: Sep. 22, 1993

[51] Int. Cl.⁶ .............................................. A47D 7/00
[52] U.S. Cl. .......................................... 5/99.1; 16/329; 403/97
[58] Field of Search ....................... 5/98.1, 98.3, 99.1; 16/327, 332; 403/93, 97, 327

[56] References Cited

U.S. PATENT DOCUMENTS

| | | | |
|---|---|---|---|
| 2,563,446 | 8/1951 | Abel | 5/99.1 |
| 4,811,437 | 3/1989 | Dillner et al. | 5/99.1 |
| 5,197,154 | 3/1993 | Shamie | 5/98.1 X |
| 5,228,154 | 7/1993 | Brevi et al. | 5/99.1 |
| 5,239,714 | 8/1993 | Huang | 5/98.1 X |
| 5,279,006 | 1/1994 | Teng | 5/98.1 X |
| 5,293,656 | 3/1994 | Chan | 5/99.1 |

FOREIGN PATENT DOCUMENTS 1557841  2/1969  France ................................. 5/99.1

Primary Examiner—Michael F. Trettel
Attorney, Agent, or Firm—Morton J. Rosenberg; David I. Klein

[57] ABSTRACT

A collapsible baby playing bed is provided. The baby bed includes an upper frame and a lower frame coupled together with four corner joints, four leg bases, and four legs. The upper frame consists of four horizontal sides, each side being made of two rods connected together by a bending joint at the center of the side. The lower frame consists of two crossing rod units, four bending joints, and two connecting rods connecting a straight rod with a curved rod of each crossing unit. Two movable bases are included with each having a foot to stand on the ground, and being connected with a respective connecting rod. Two locking bases are also provided, each having a foot to stand on the ground and being connected with a respective straight rod. The lower frame is capable of being collapsed, which in turn permits the upper frame to be collapsed.

1 Claim, 12 Drawing Sheets

COLLAPSIBLE BABY PLAYING BED

BACKGROUND OF THE INVENTION

A conventional collapsible baby bed shown in FIGS. 20 and 21. The bed includes an upper frame 11, four feet 12, four foot bases 13, a lower frame 14, four corner joints 15, four bending joints 16, a bed cover 17 and a bed mattress 18.

The upper frame and the lower frame are connected together with the four feet 12, the four feet extending respectively between the four corner joints 15 and the four foot bases 13. Each of four horizontal sides of the upper frame 11 are made of two rods connected together by a bending joint 16 at the central portion of the side, and the bending joints 16 are able to be bent down to a certain angle, or to be locked straight. The bed cover 17 covers the whole frame and the bed mattress 18 is laid on a bottom formed by the lower frame. The bed mattress has enough thickness and strength for a baby to sit, stand or lie thereon. The cover is made of four pieces bendably sewn together and a hook means is affixed on a front end thereof, so as to wrap the bed frame in a collapsed state, as shown in FIG. 19, for carrying and storage.

The quality of a collapsible baby playing bed depends upon the materials used for forming the bed frame, the collapsible structure of the upper and lower frames, and the stability and safety of the whole frame after it is spread out. In using the bed, it should have enough safety and stability for a baby to play or sleep therein. For collapsing, the lower frame should be pulled up easily by a pull slip and then the upper frame should be folded to the center. The lower frame of the conventional baby playing bed, shown in FIG. 21, has a structure where components are pivotally connected with other components so as to bend a little inward, so that it may not collide with the upper frame. The lower frame has four connectors 19 and a supporter 191 for collapsing, spreading and supporting the whole frame and a mattress.

The lower frame of the conventional collapsible baby bed just described has been found to have the following undesirable disadvantages:

1. When the whole bed is spread out, it is supported only at the center and at four corners, and especially, there is not enough support for the bed mattress, which is easily forced to deform or break because of the weight of a baby playing in it; and, 2. The bending joints of the upper frame are not provided with a safe means for preventing displacement, so should a baby in the bed touch and press one of the bending joints by accident or curiosity, the upper frame would be collapsed, causing danger to the baby.

SUMMARY OF THE INVENTION

This invention has been devised to offer a collapsible baby playing bed, which has an improved frame having sufficient safety and stability for use with small children.

A collapsible baby playing bed in the present invention has a lower frame consisting of two crossing rod units, two connecting rods, and two movable bases, combined to form a bottom structure. The bottom structure is of sufficient stability after it is spread out and yet is easy to collapse.

The collapsible baby playing bed of the present invention has been planned to have desirable advantages as follows:

1. Two connecting rods are pivotally connected with two crossing rod units to form a beehive-like frame structure for the lower frame, which provides a large base for supporting the bed mattress very firmly and stably;

2. The beehive-like lower frame consisting of two crossing rod units with help of the movable bases and two locating bases forms a plurality of feet to support the whole frame, improving upon single supporting point of the prior art;

3. The lower frame is very stable, without the possibility of deformation, twisting or shaking, after it is spread out, and its collapsing operation is very simple, and the collapsed dimensions are quite small; and, 4. The upper frame is protected against accidental folding by a child, once the upper frame is spread out, because in the spread out condition four feet are pushed outward by the lower frame and the four corner joints press down rods of the upper frame with a predetermined force so that four bending joints are not easily pressed down. Therefore the upper frame cannot be collapsed until the lower frame has been collapsed, getting rid of the force of the corner joints pressing the rods of the upper frame.

BRIEF DESCRIPTION OF THE DRAWINGS

The invention will be better understood by reference to the accompanying drawings, wherein.

DESCRIPTION OF THE PREFERRED EMBODIMENTS

Figure 1:
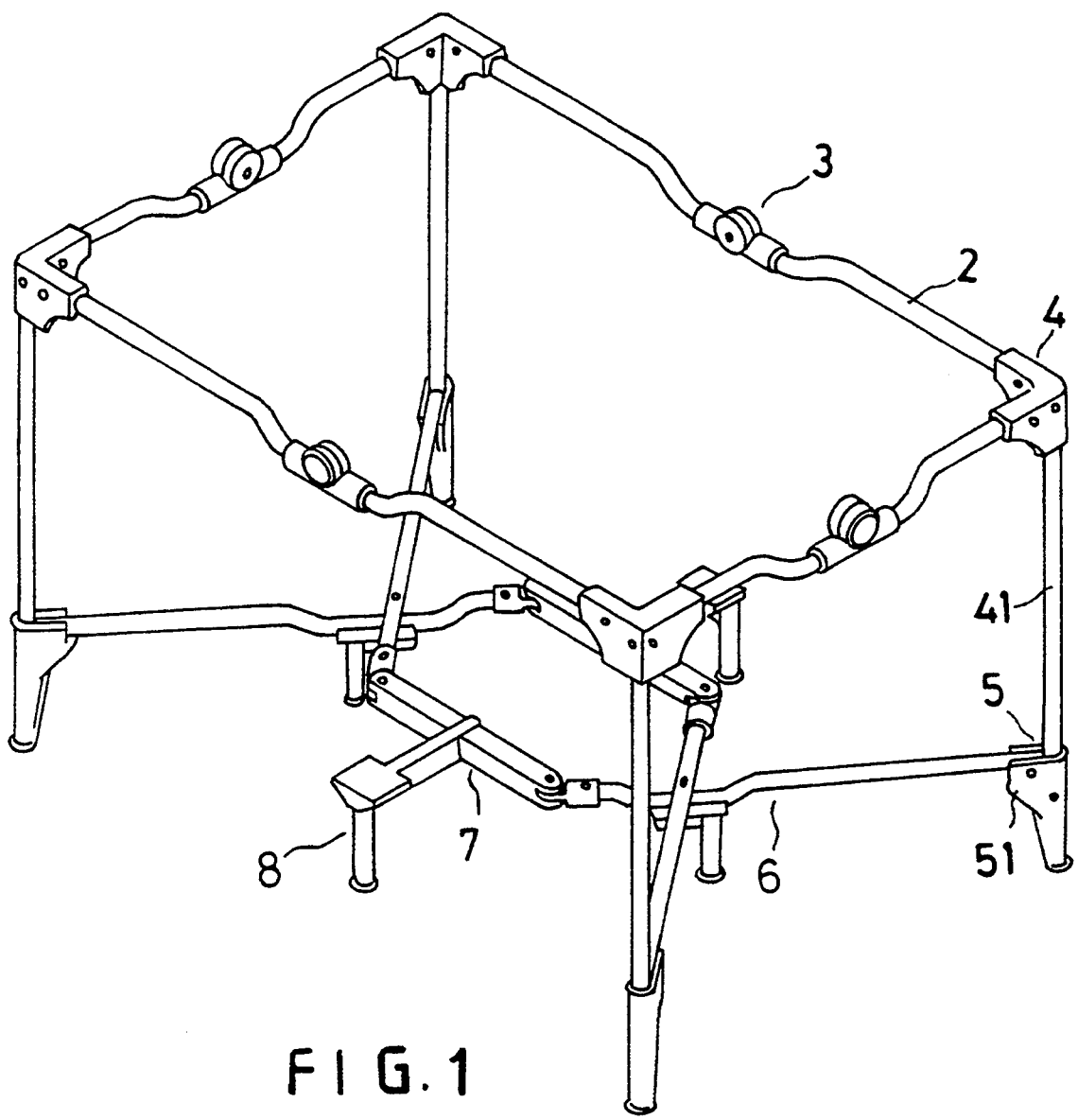
FIG. 1 is a perspective view of a whole frame of a collapsible baby playing bed of the present invention.

A collapsible baby playing bed in the present invention, as shown in FIG. 1, includes an upper frame 2 consisting of four horizontal sides each made of two rods connected with bending joints 3. Four corner joints are provided for connecting each of the two rods of the two neighboring horizontal sides and a vertical leg 41. Frame 2 further includes a lower frame consisting of four leg bases 5, two crossing rod units 6, 6, two connecting rods 7, 7, and two movable bases 8, 8 as main components.

Figure 2:
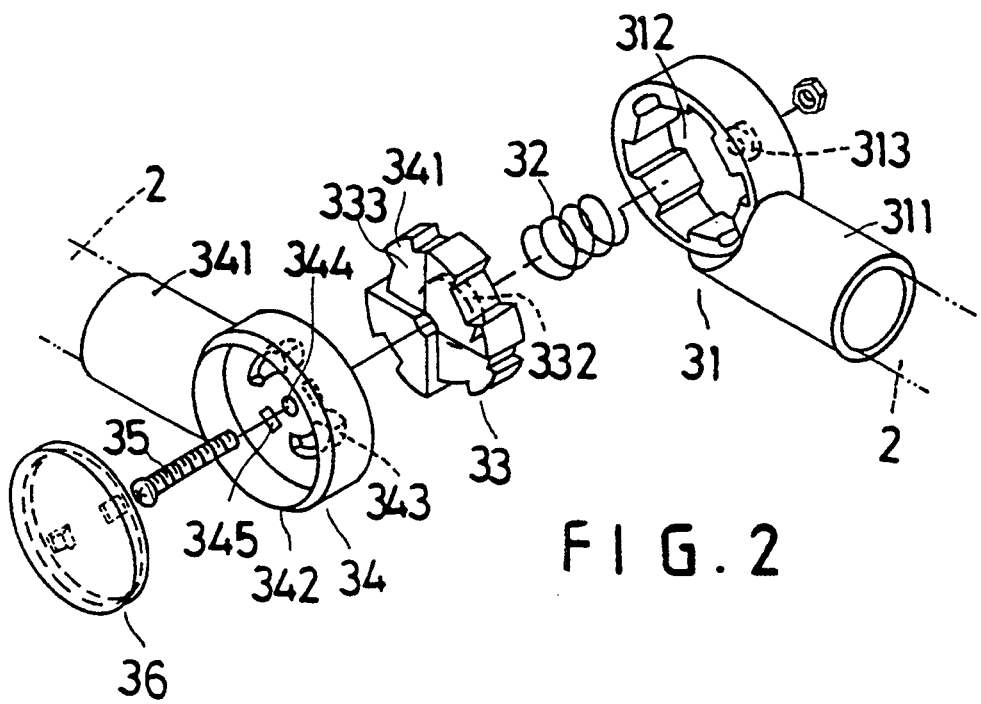
FIG. 2 is an exploded perspective view of a bending joint of an upper frame of the collapsible baby playing bed of the present invention.

Referring to FIG. 2, there is shown each horizontal side of the upper frame 2 having two rods connected with bending joints 3, which has an inner tooth member 31, a spring 32, a fitting block 33, a bending member 34, a push cap 36 and a bolt and nut 35 combined together. The inner tooth member 31 has a tubular portion 311 for receiving one end of a rod of a respective horizontal side of the upper frame 2, a round inner tooth portion 312 and a central hole 313 formed through a side of the inner tooth portion 312. The fitting block 33 is provided with projecting teeth 331 extending radially outward to engage the inner teeth of the inner tooth portion 312, and a central recess 332 formed in one side thereof for receiving one end of the spring 32 therein, and two opposing sectorial recesses 333, 333 formed on the opposing side.

The bending member 34 has a tubular portion 341 for receiving a rod of a respective horizontal side of the upper frame 2 therein, and a round case portion 342 for receiving a push cap 36 to fit in an open side thereof, and two opposing sectorial projections 343, 343 on the opposing side to fit in the sectorial recesses 333, 333 of the fitting block 33, and a central through hole 344 for the bolt 35 to pass therethrough, and two holes 345, 345 disposed on opposing sides of the central hole 344 for passage of two locking bolts 361 of the push cap 36. The holes 345 each have a recessed step 346 for receiving a hook 362 of a respective locking bolt 361, to engage and prevent the cap 36 from loosening therefrom.

Figure 3:
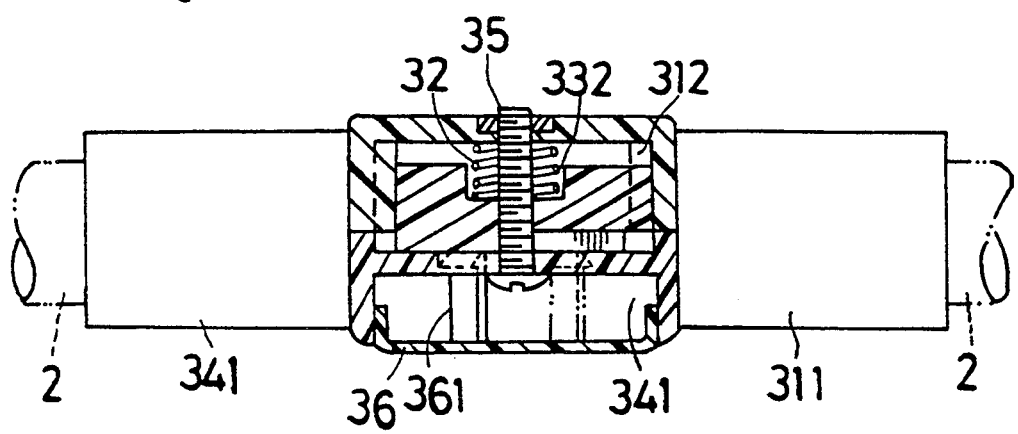
FIG. 3 is a cross-sectional view of the bending joint of the upper frame of the collapsible baby playing bed of the present invention.
Figure 4:
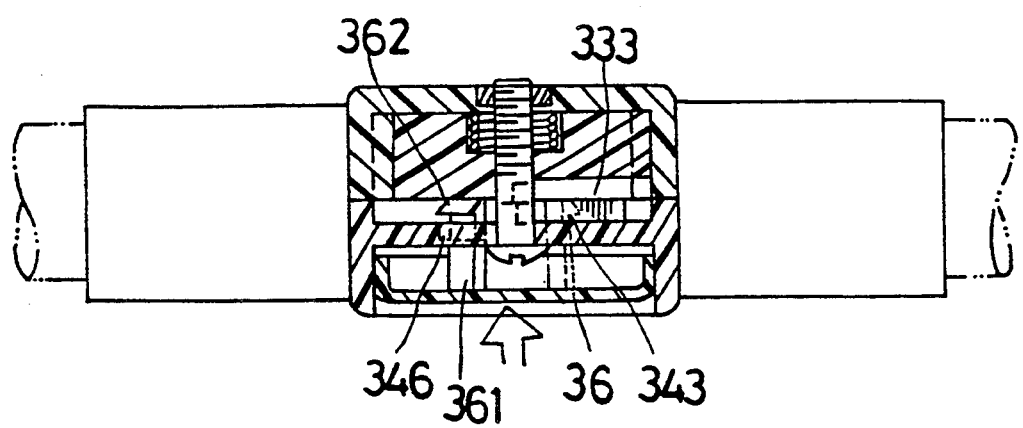
FIG. 4 is a cross-sectional view of the bending joint compressed in the collapsible baby playing bed of the present invention.
Figure 5:
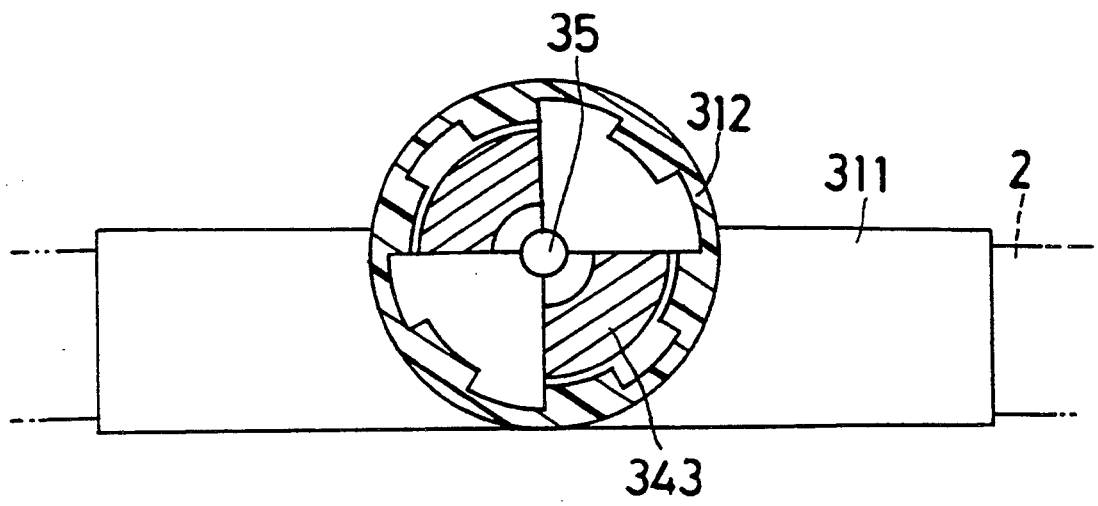
FIG. 5 is a cross-sectional view of the bending joint of the collapsible baby playing bed of the present invention, showing the bending joint kept in straight condition.
Figure 6:
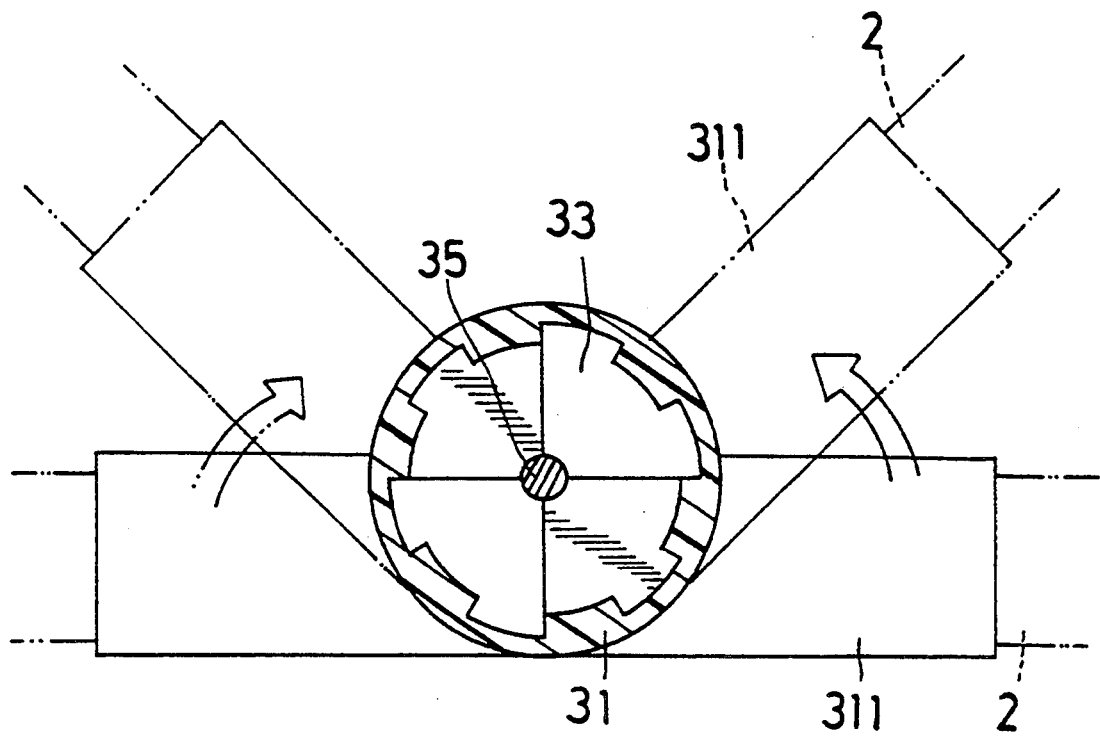
FIG. 6 is a cross-sectional view of the bending joint of the collapsible baby playing bed of the present invention, showing the bending joint kept in bent condition for a right angle.

After assembling the bending joint 3, as shown in FIG. 3, the fitting block 33 engages the inner teeth 312 and is urged by the spring 32 to move in a direction to force the sectorial recesses 333 to engage the sectorial projections 343 of the bending member 34 and thereby to lock the bending joint 3. When the push cap 36 is pressed down, as shown in FIG. 4, two locking bolts 361 push the fitting block 33, separating it from the bending member 34. The sectorial recesses 333 disengage from the sectorial projections 343, enabling the angle of the bending joint 3 to be altered, as shown in FIGS. 5 and 6.

The corner joints 4 respectively form elevational right angles, i.e., 90 degrees, and are each pivotally connected with ends of two neighboring rods of two horizontal sides of the upper frame 2, for forming a rectangular shape. Each corner joint 4 is also coupled to a vertical leg 41, each vertical leg having its lower end coupled to a leg base 5. Each leg base 5 has a projecting plate 51 for pivotal connection with the crossing rod units 6, 6.

Figure 7:
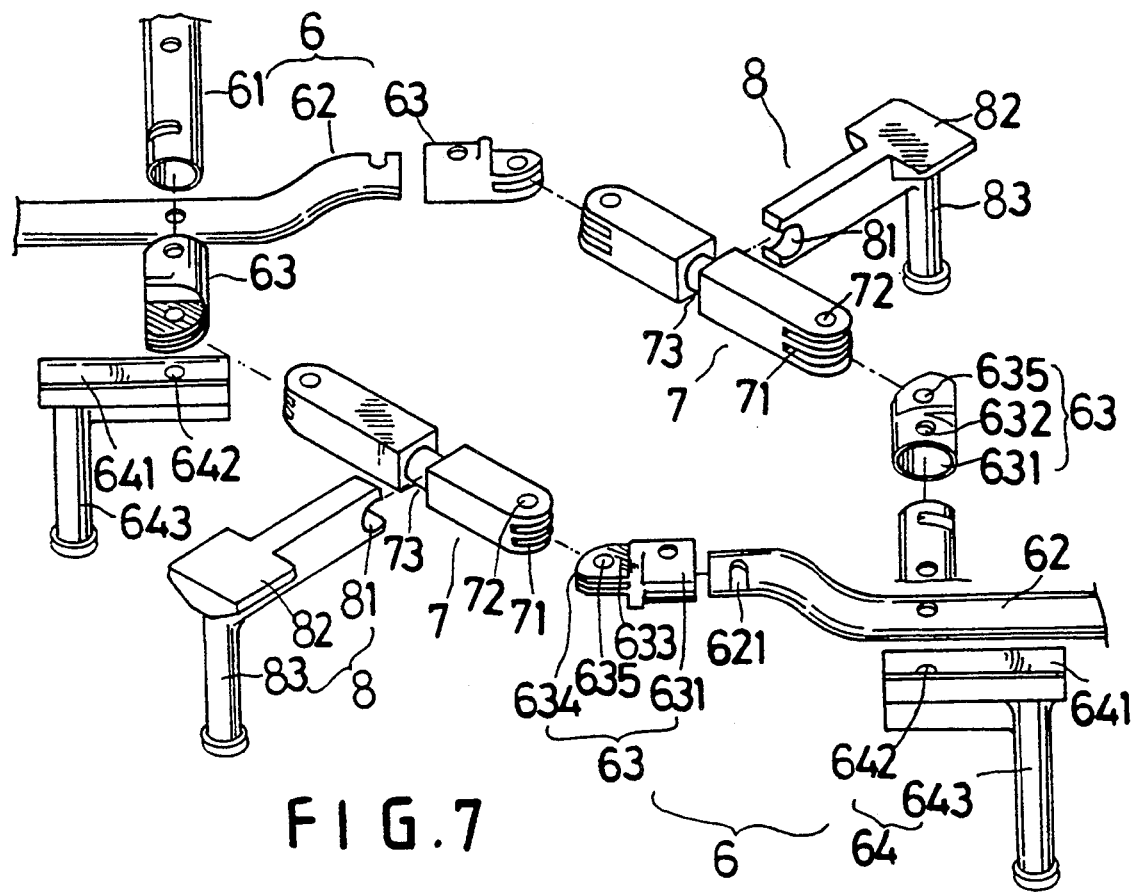
FIG. 7 is an exploded perspective view of a lower frame of the collapsible baby playing bed of the present invention.

The lower frame includes two crossing rod units 6, 6, two connecting rods 7, 7, four middle joints 63, two locating bases 64, 64, and two movable bases 8, 8. The two crossing rod units 6, 6 respectively include a straight rod 61 and a curved rod 62 are pivotally and crossingly connected to each other as shown in FIG. 7. The outer ends of each straight rod 61 and each curved rod 62 are coupled to the projecting plates 51 of the leg bases 41, but the other ends thereof are formed with two opposing slotted through openings 611, 621. Two locating bases 64, 64 are provided under the crossing point of the two rods 61, and 62 for supporting the crossing rod units 6, 6.

Each of four middle joints 63 respectively have a tubular portion 631 at one end with a pair of through holes 632 formed in opposing sides of the tubular portion 631, a connecting portion 633 at the other end, a sloped locating surface 634 and a through hole 635 formed in the connecting portion 633.

Each of two locating bases 64, 64 have a T-shape and a curved-down surface 641 on a horizontal portion thereof, for supporting the curved rod 62. A hole 642 is formed through the horizontal portion for a bolt to couple the locating bases 64, 64 with the crossing rod units 6, 6. A leg 643 defines a vertical portion of the locating base.

The two connecting rods 7, 7 respectively have two horizontal grooves 71, 71 and a hole 72 for pivotal coupling on opposing ends thereof, and an annular groove 73 formed in an intermediate portion.

Each of the two movable bases 8, 8 respectively have an L-shape, and a C-shaped notch 61 formed in the end of the horizontal portion. A flat plate 82 is disposed at the other end of the horizontal portion, and a vertical leg 63 defines the vertical portion thereof.

Figure 8:
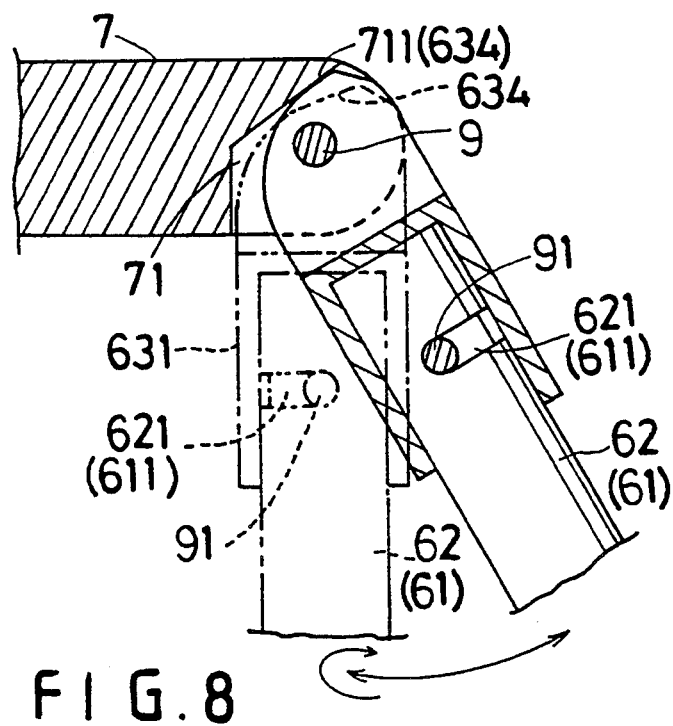
FIG. 8 is a plan view of the lower frame being collapsed in the collapsible baby playing bed of the present invention.

In assembling the lower frame, as shown in FIG. 1, the linking portion 633 of each middle joint 63 is placed to engage a respective groove 71 of each connecting rod 7 and pivotally connected therewith by means of a respective bolt 9 shown in FIG. 8. The tubular portion 631 of each middle joint 63 is connected pivotally with either a straight rod 21 or a curved rod 22 by means of a bolt and nut 91 protruding through the through holes 632 and the slotted openings 611, 621. The C-shaped notch 81 of the movable base 8 is made to engage the annular groove 73 of the connecting rod 7, so as to enable the movable base 8 to be displaceable.

Figure 13:
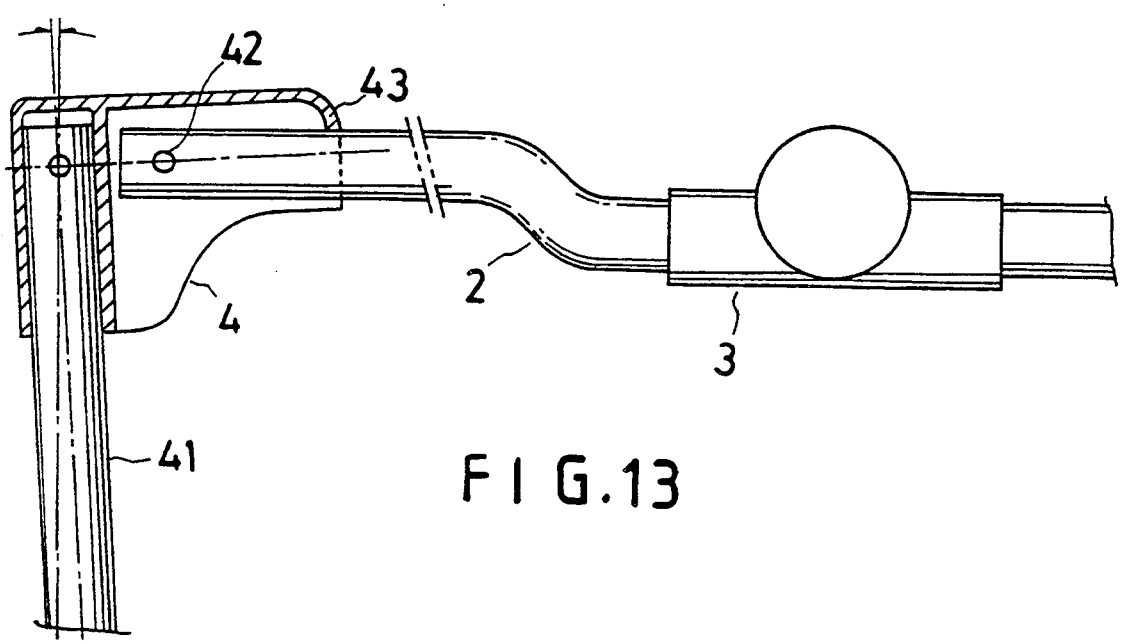
FIG. 13 is a cross-sectional view of a corner joint with the upper frame spread out in the collapsible baby playing bed of the present invention, while the lower frame is not spread out.
Figure 14:
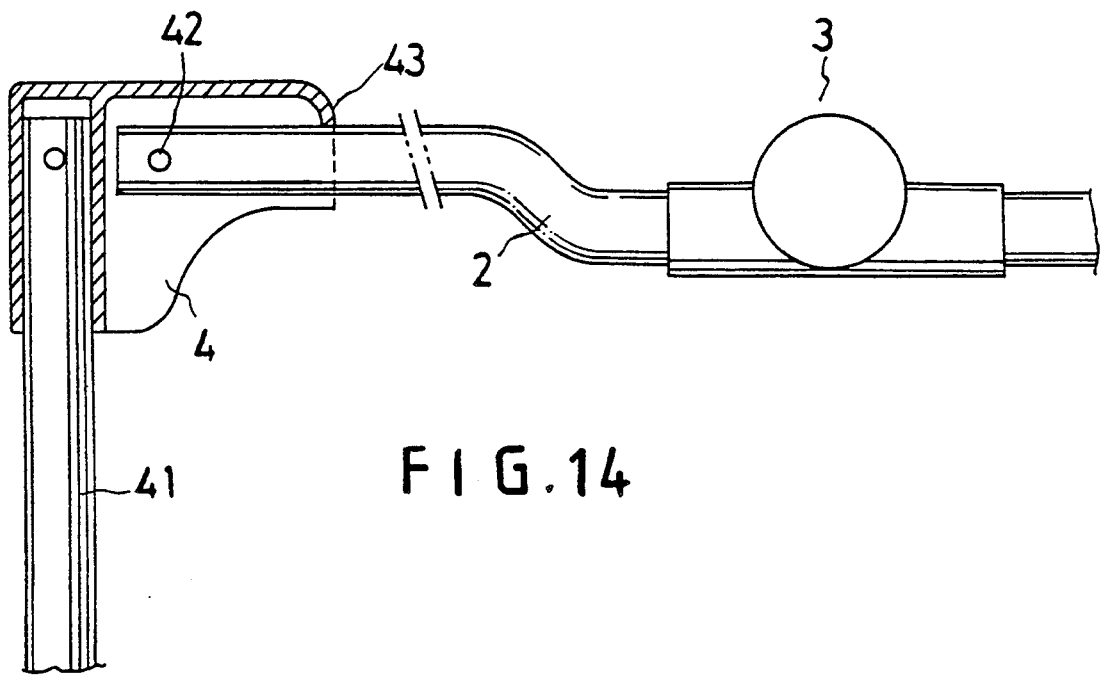
FIG. 14 is a cross-sectional view of the corner joint with the upper frame spread out in the collapsible baby playing bed of the present invention, while the lower frame is spread out.

In order to protect a baby playing in this bed from the possible dangers which could occur by touching the bending joints, the upper frame 2 has been designed to be provided with a safe structure for pivotal connection of the corner joints 4. As shown in FIG. 13, the pivotal connection of the upper frame is completely spread out in relation to the corner joint 4. One rod of a horizontal side of the upper frame 2 has its one end pivotally connected with the corner joint 4 by means of a pivot pin 42, and an outer end of the corner joint 4 is formed with a bent-down tip 43 touching an outer surface of the end of the rod. When the lower frame has not been spread out completely, the leg 41 has its bottom end inclined inwardly. But, when the lower frame has been completely spread out, as shown in FIG. 14, the leg 41 is forced to swing outward to a vertical position, and the corner joint 4 is also pushed by the leg 41, with the bent-down tip 43 pressing down the rod. The rod of the upper frame and the leg 41 all have a little elasticity so that the corner joint 4, the upper and the lower frame and the bending joint 3 are kept in tight condition after the leg 41 has been forced to stand vertical by the rods of the upper frame. Then the whole frame of the bed is kept in a very stable condition. Since the bending joints 4 all are under pressure, it is impossible for the bending joints to be accidentally pressed down by a child in the bed, before the lower frame is collapsed. Consequently, this bed is very safe, and free from accidental collapse.

Figure 12:
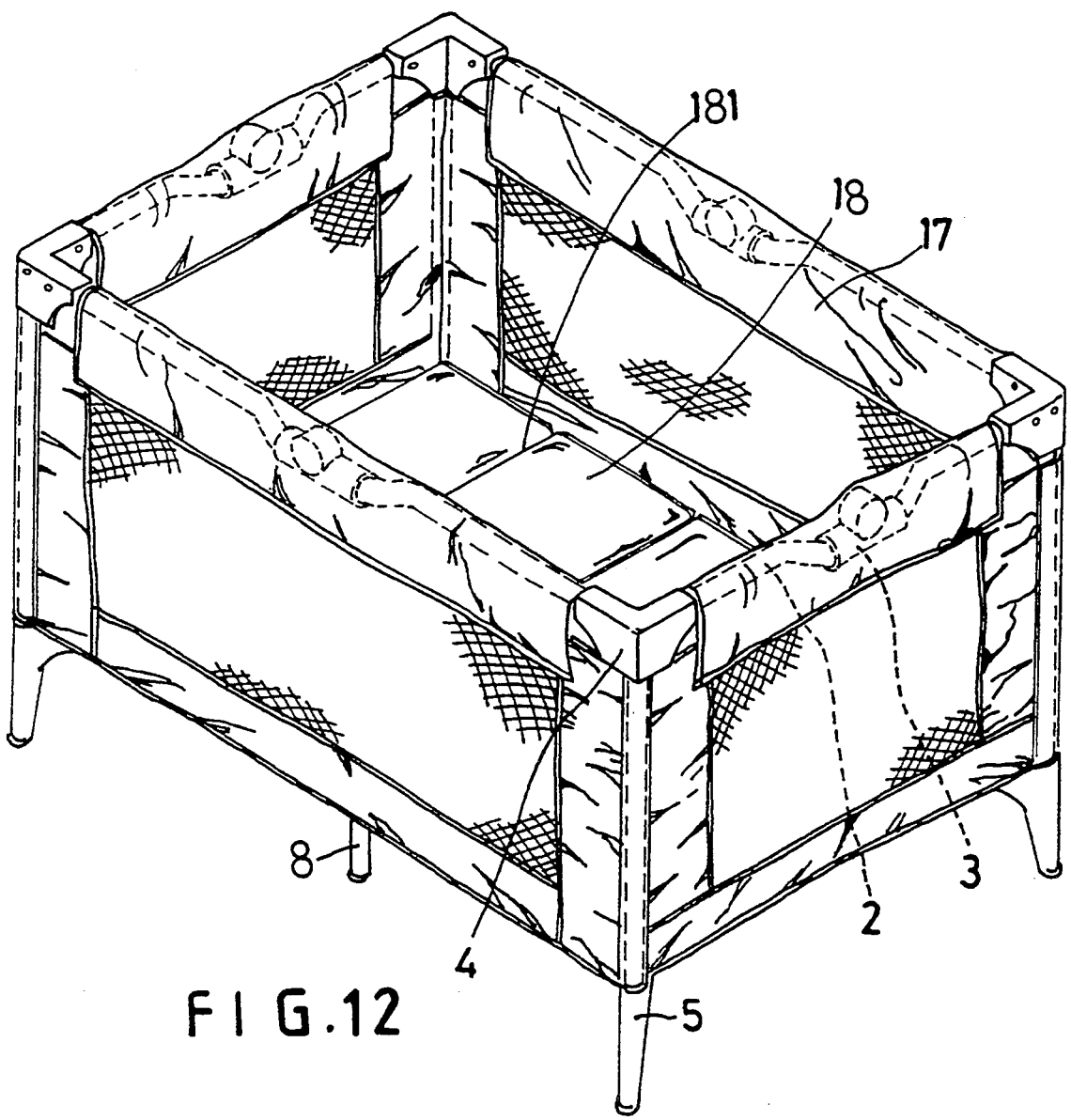
FIG. 12 is a perspective view of the collapsible baby playing bed of the present invention.
Figure 15:
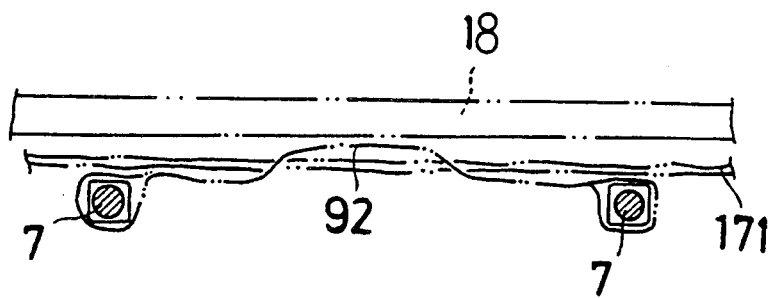
FIG. 15 is a side view of the lower frame with a mattress and a bed cover combined together in the collapsible baby playing bed of the present invention, and the lower frame is in spread condition.
Figure 16:
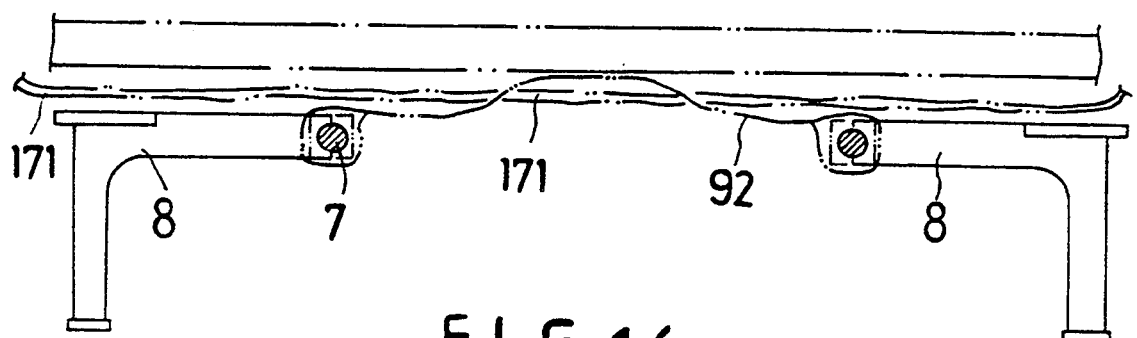
FIG. 16 is another side view of the lower frame with a mattress and a bed cover combined together in the collapsible baby playing bed of the present invention, and the lower frame is in spread condition.
Figure 18:
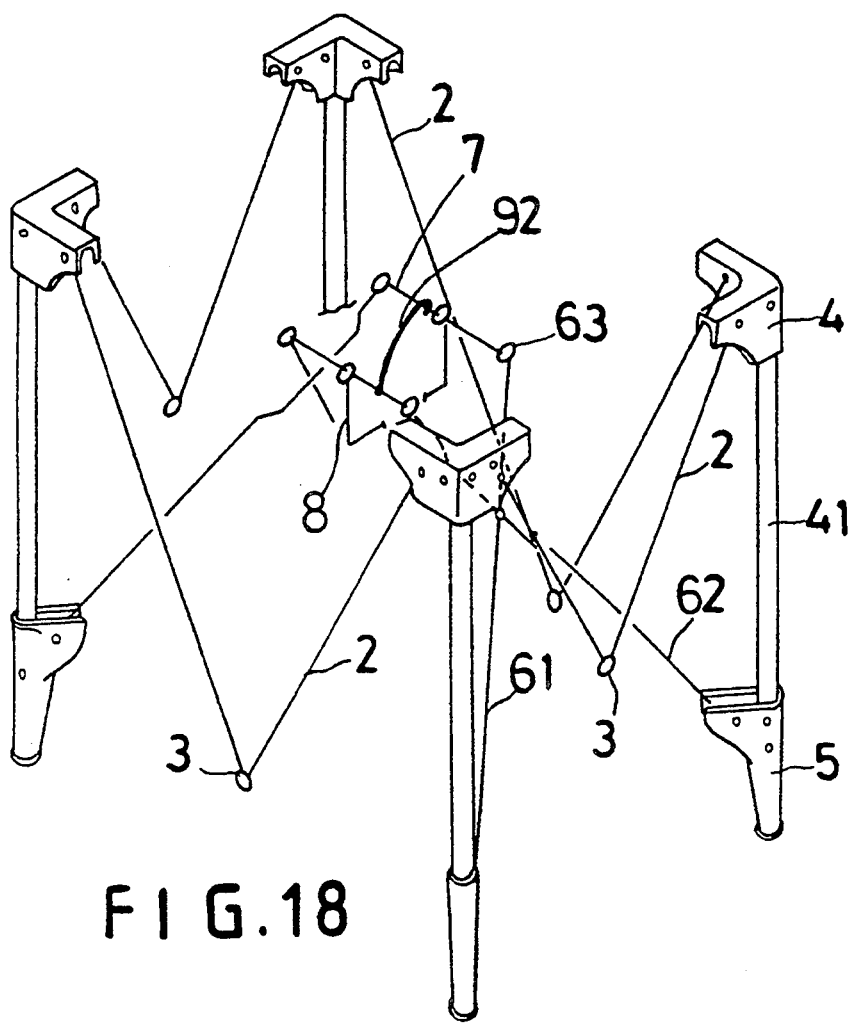
FIG. 18 is a perspective view of how the whole frame is to be collapsed in the collapsible baby playing bed of the present invention.

As shown in FIGS. 12 and 18, a cloth pulling slip 92 is provided with the bed cover 17 for binding to the two connecting rods 7, 7. A bed mattress 18 is placed on a bottom formed by the lower frame, as shown in FIGS. 15 and 16.

Figure 17:
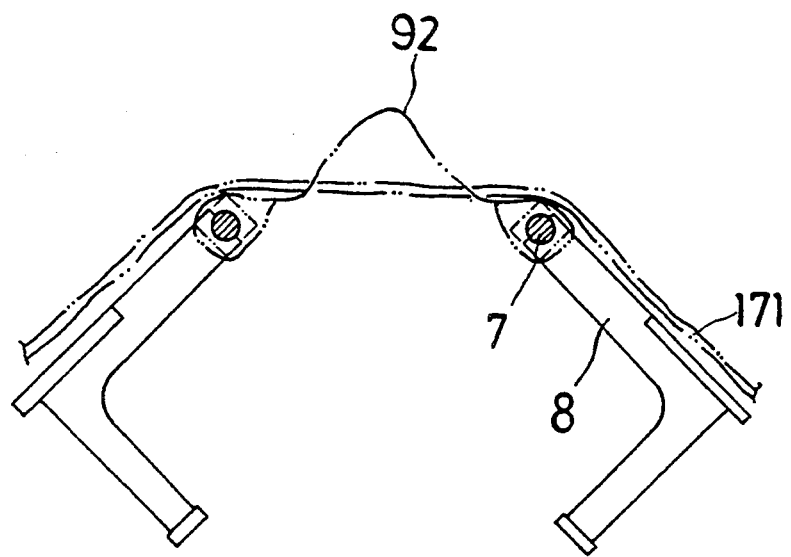
FIG. 17 is a side view of the lower frame with a mattress and a bed cover combined together in the collapsible baby playing bed of the present invention, and the lower frame is being collapsed.
Figure 19:
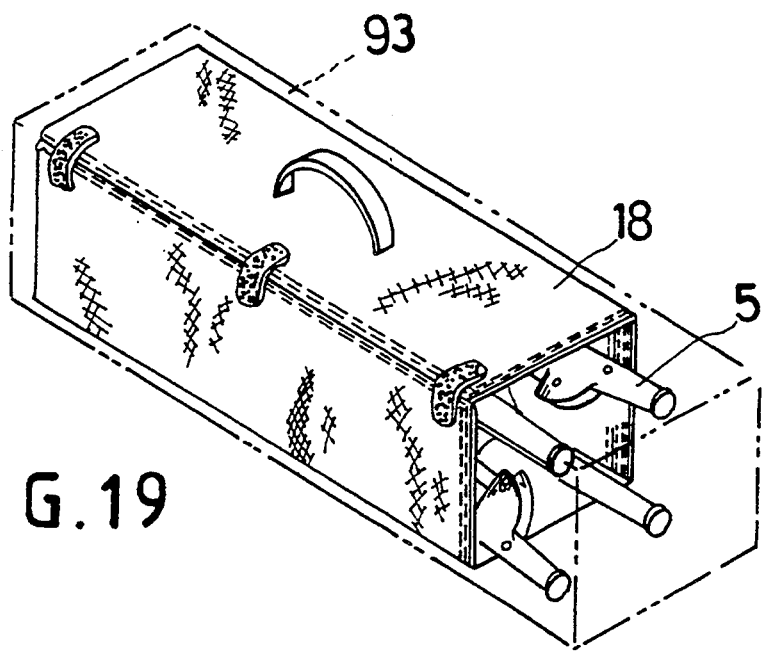
FIG. 19 is a perspective view of the collapsible baby playing bed collapsed and wrapped in the mattress of the present invention.
Figure 20:
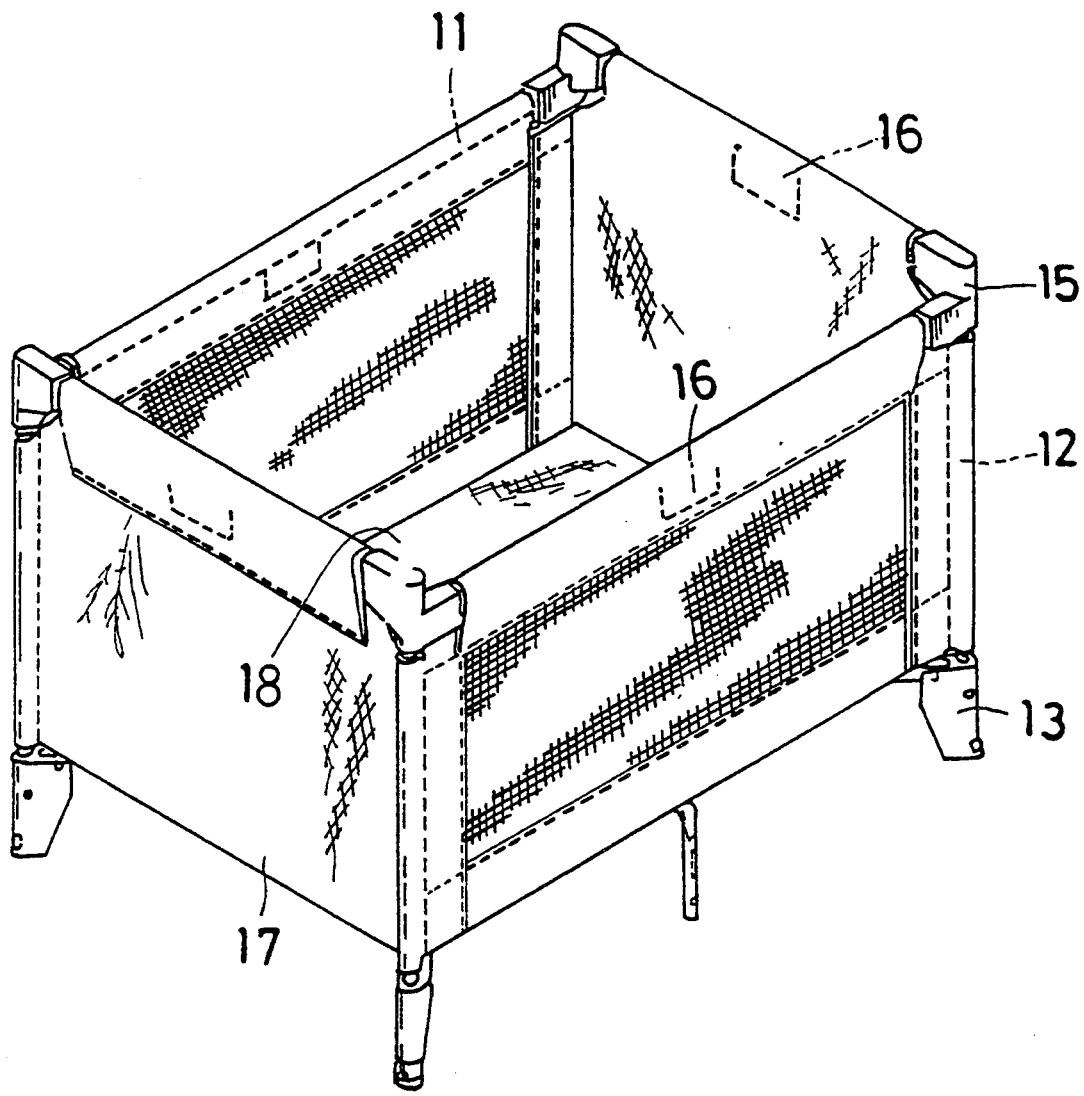
FIG. 20 is a perspective view of a conventional collapsible playing bed.
Figure 21:
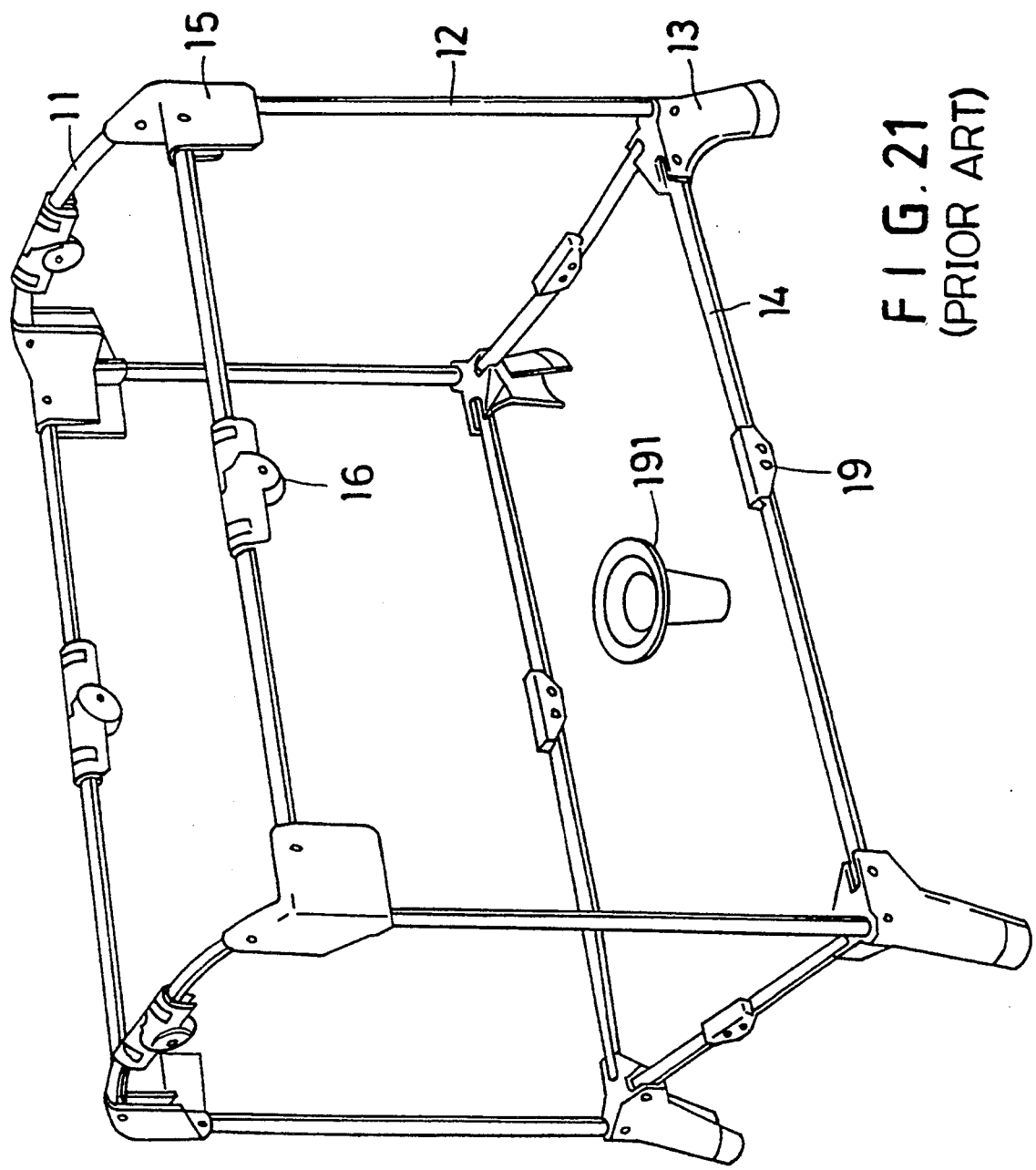
FIG. 21 is a perspective view of the whole frame of the conventional collapsible baby playing bed; and, FIG. 22 is a side view of the conventional collapsible baby playing bed.
Figure 22:
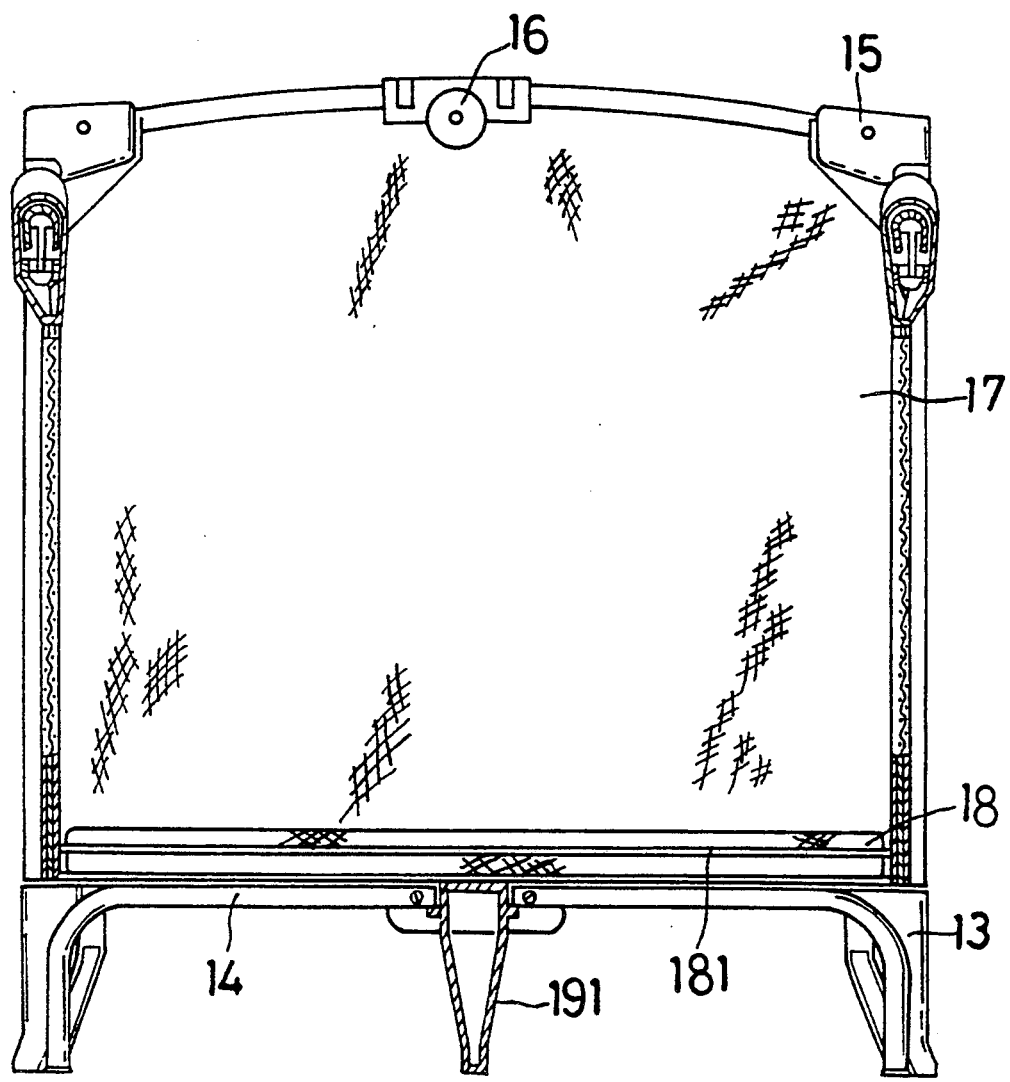

To collapse this baby bed, first, take out the bed mattress 18, and pull up the cloth pulling slip 92 and let the two connecting rods 7, 7 gradually rise up until they are folded and come together, as shown in FIG. 17. After that, the bending joints 3 of the upper frame 11 are pushed down to force the rods of the upper frame 2 to bend down, as shown in FIG. 18, and the pulling slip 92 is continuously pulled up, forcing all the legs 41 to be displaced and come together at the center, until all the corner joints 4 contact with one another. Then this baby bed is collapsed to the minimum size. Subsequently, the collapsed frame is placed on, and wrapped in, the mattress 18 as shown in FIG. 19. Finally, the collapsed bed and mattress are put in a bag 93 as shown in FIG. 19.

Figure 9:
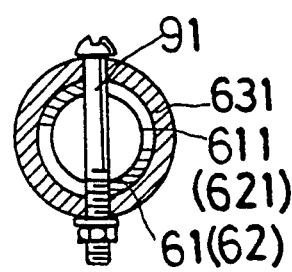
FIG. 9 is a cross-sectional view of a middle joint of the lower frame of the collapsible baby playing bed of the present invention.
Figure 10:
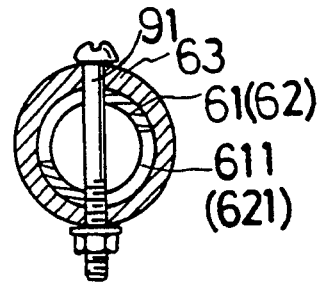
FIG. 10 is another cross-sectional view of the middle joint of the lower frame of the collapsible baby playing bed of the present invention.
Figure 11:
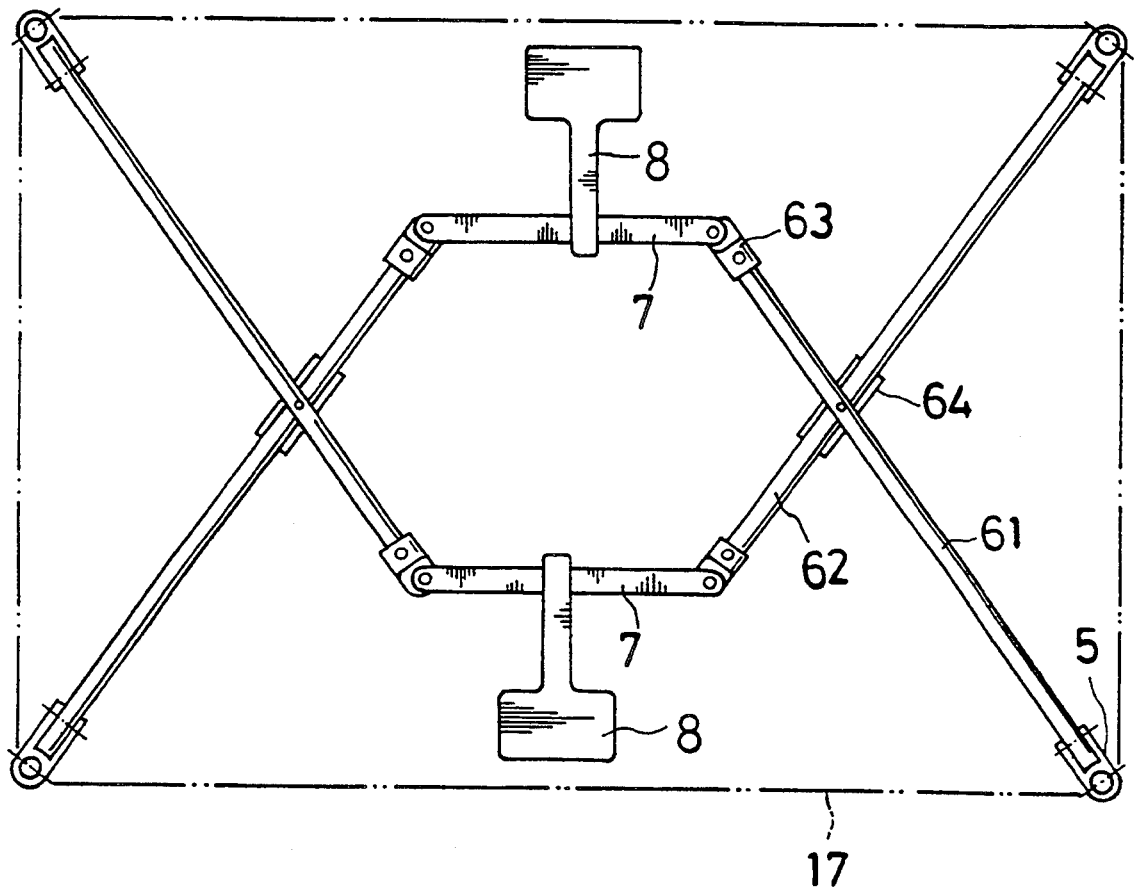
FIG. 11 is a plan view of the whole frame of the collapsible baby playing bed of the present invention.

As shown in FIG. 11, the straight and the curved rods 61, and 62 of the crossing unit 6 are pivotally connected with the two connecting rods 7, 7 and are all of the same length to keep the whole frame very stable, not causing deformation, twisting, or shaking. The middle joints 63 and the connecting rods 7, 7 should have a proper connecting angle, as shown in FIG. 8. Then the groove 71 of the connecting rods 7, 7 are provided with an outer stop surface 711 to contact and engage the locating surface 634 of the middle joints 63, when the middle joints 63 are swung outward to the largest angle. This enables the crossing rod units 6, 6 to be kept very stable after they are spread out, without the possibility of deformation, twisting or shaking. When the two connecting rods 7, 7 are pulled up together, they may be lifted up easily, and gradually turn through a predetermined angle to move inward and nearly together. This alteration of the angle, caused by the bending, is tolerated by the slotted through openings 611, 621, as shown in FIGS. 8-10.

While the preferred embodiment of the invention has been described above, it will be recognized and understood that various modifications may be made therein, and the appended claims are intended to cover all such modifications which may fall within the spirit and scope of the invention.

What is claimed is:

1. A collapsible baby playing bed comprising:

an upper frame having four horizontal sides, each of said horizontal sides being formed of two rods connected with a bending joint and four corner joints, each of said corner joints pivotally connecting two neighboring horizontal sides and a vertical leg;

four bending joints, each bending joint including (1) a right half joint having a tubular portion for receiving a respective one of said two rods of a respective horizontal side of said upper frame, a round inner tooth portion and a central through hole formed in a side thereof, (2) a fitting block having a plurality of projecting teeth extending radially outward, said teeth engaging with inner teeth formed in said inner tooth portion of said right half joint, said fitting block having a central recess formed in a right side wall thereof and two opposing sectorial recesses, (3) a spring disposed between said side of said right half joint and said fitting block, one end of said spring being disposed within said central recess, (4) a left half joint having a tubular portion for receiving a respective one of said two rods of said horizontal side of said upper frame, said left half joint having a round case portion for receiving a push cap in an open side thereof and two opposing sectorial projections formed on a right side wall thereof to engage said sectorial recesses of said fitting block, said left half joint further having a central hole formed through said right side wall and two through holes formed on opposing sides of said central hole for receiving two locking bolts extending from said push cap, said through holes each having a recessed step for matingly receiving a hook portion of each of said locking bolts to lockingly engage said push cap, (5) a bolt and a nut threadedly engaged to said bolt, said bolt passing through said central through hole of said right half joint and said central hole of said left half joint to couple each to the other, and (6) said push cap being provided to fit in an open side of said round case portion of said left half joint to thereby angularly adjust said left half joint relative to said right half joint;

said four corner joints being bent for 90 degrees and pivotally connected with two neighboring rods of said four horizontal sides of said upper frame to form said upper frame into a rectangular shape, each of said corner joints being firmly connected with a respective one said four legs;

said four legs being vertically and firmly connected with said corner joints and supported by four leg bases on a base surface;

each of said four leg bases being connected to a bottom end of a respective one of said four leg bases to stand on the base surface;

a lower frame including two crossing rod units, two connecting rods, four middle joints, two locating bases and two movable bases;

each of said two crossing rod units including a straight rod and a curved rod crossingly and pivotally connected together, outer ends of said two straight rods and said two curved rods being pivotally connected with respective projecting plates of said four leg bases, inner ends of said straight rods and said curved rods being pivotally connected with said middle joints, said inner ends of each of said straight and curved rods being formed with slotted through openings for receiving bolts therein to couple said straight rods and said curved rods with said middle joints;

each of said four middle joints having a tubular portion for receipt within a respective one of said straight or curved rods and a lateral hole for receiving a bolt to couple said middle joint therewith, each of said middle joints having a linking portion provided with a front sloped locking surface and a lateral hole for a bolt to couple said middle joint with one said connecting rod;

said two locating bases being shaped as a T and having a curved-down surface in a horizontal portion for supporting said curved rod, each of said locating bases having a hole formed in said surface for receiving a bolt to couple said bases to said curved rods, each of said locating bases having a vertical portion defining its vertical portion;

said two connecting rods each having two horizontal grooves and a pivot hole formed in opposing ends thereof and an annular groove intermediate said opposing ends;

said two movable bases each having a C-shaped notch at one end and a flat plate portion formed on an opposing end of a horizontal portion thereof and a vertical portion defining a leg; and, each said linking portion of each said middle joint fitting in said horizontal grooves of each said connecting rod and being pivotally connected together with a bolt, each said C-shaped notch of each said movable base movably engaging said annular groove of said connecting rod, a cloth pull slip provided to protrude through a bottom cloth of a bed cover and being bound on said two connecting rods, a bed mattress being laid on a bottom formed by said lower frame, and thereby forming a baby playing bed.

* * * * *